G. W. HERSEY.
CAR STEP.
APPLICATION FILED OCT. 11, 1912.
1,090,534.
Patented Mar. 17, 1914.
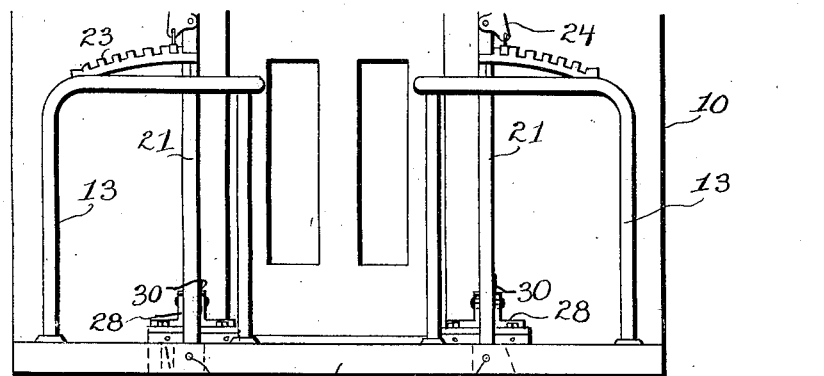
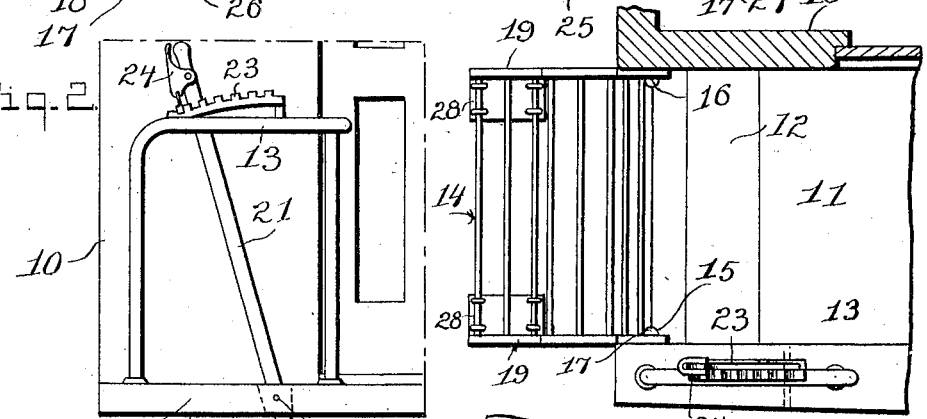
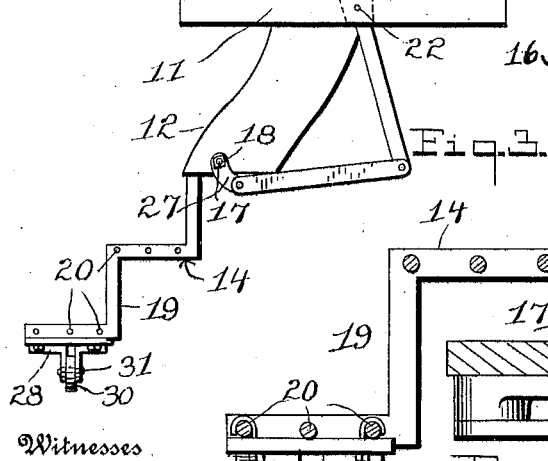
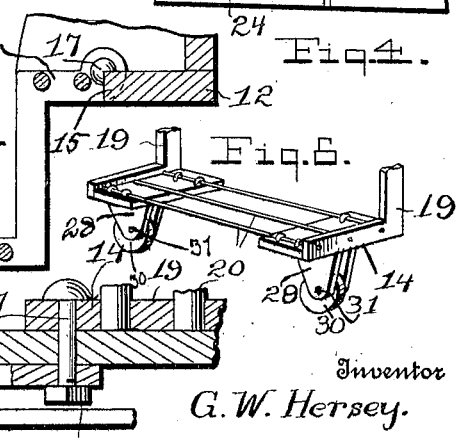
Inventor
G. W. Hersey.
Witnesses

UNITED STATES PATENT OFFICE.

GEORGE W. HERSEY, OF LOGGIEVILLE, NEW BRUNSWICK, CANADA.

CAR-STEP.

1,090,534.

Specification of Letters Patent. Patented Mar. 17, 1914.

Application filed October 11, 1912. Serial No. 725,216.

*To all whom it may concern:*

Be it known that I, GEORGE W. HERSEY, a subject of the King of England, residing at Loggieville, in the Province of New Brunswick, Dominion of Canada, have invented certain new and useful Improvements in Car-Steps; and I do hereby declare the following to be a full, clear, and exact description of the invention, such as will enable others skilled in the art to which it appertains to make and use the same.

This invention relates to certain new and useful improvements in car steps and more particularly to extension car steps primarily adapted to assist in the entering and leaving railway cars and also to avoid accidents at stations by preventing persons from stepping between the car steps and platform.

Generically, the invention consists of a supplemental or extension step for railway cars, operable by means of a lever from the platform of the car, so as to dispose the lowermost step over the platform or in close proximity to the surface of the ground or of the platform, whereby the entering and leaving the car will be greatly facilitated, and the ordinary hopping off the cars will be obviated, inasmuch as the extension step will be raised until such time as lowered by the operator on the car.

With the above and other objects in view, my invention will be more fully described, illustrated in the accompanying drawings which show a preferred embodiment of my device and then specifically pointed out in the claim which is attached to and forms a part of this application.

In the drawings:—Figure 1 is an end elevation of a fragmentary portion of a car or coach and showing my improved extension step, shown in a raised position. Fig. 2 is a view similar to Fig. 1 but showing only a fragmentary portion and showing the steps lowered. Fig. 3 is a cross sectional detail view. Fig. 4 is a top plan view, a fragmentary portion of the step being shown. Fig. 5 is a sectional view taken on the line 5—5 of Fig. 1. Fig. 6 is a detail view of one of the lowermost of the extension steps and the rollers attached thereto.

In illustrating the practical embodiment of the invention, there is shown the body 10 having a platform 11 and the usual stationary steps 12 by which the passengers approach and leave the car while the usual hand rails 13 are also arranged at the far ends of the steps and extend between the central portion of the platform and the bottommost of the steps. The extension steps are indicated by the numeral 14 and it will be observed that the upper step terminates midway between one of the tread portions of the steps as indicated at 15 where the adjacent tread portion 16 of the upper part of the extension step is pivotally connected thereto through the medium of pivot rods 17 fastened by binding nuts 18. The extension steps as shown, comprise side members 19 having their tread portions connected by bars 20 spaced apart so as to provide a very efficient tread surface which may also be employed for scraping the feet of the passengers in entering the car and also prevent the accumulation of dirt such as would be occasioned by the use of steps of solid formation. Thus by reason of the fact that the said portions of the said stationary step and the upper extension step are connected intermediate of their widths, the said tread portions thus provided will move together so as to abut each other when the lower extension step is pivoted on the stationary step and in this position, the extension step will not interfere with the proper use of the stationary step. As is of course understood two of the pivot connections 17 are provided for each extension step, the same extending through the opposite sides thereof.

In order to operate the extension steps on their pivots, levers 21 are pivotally connected or mounted through the platform 11 as shown at 22 and having their upper portions operating in rack guides 23 which are engageable by hand latches 24 carried by the levers to hold the levers in adjusted position. The lower portions of the levers are connected pivotally as shown at 25 with link bars 26 which are in turn connected to arcuate or curved arms 27 which also have connection with the upper extremities of the side portions of the extension steps and it will be seen that movement of the levers on their pivots will cause the extension steps to be moved toward and away from the stationary steps for use as desired. The lowermost of the extension steps also carries a wheeled seat or frame 28 having a depressed central portion 29 forming a groove having rotatable wheels or rollers 30 mounted upon shafts 31 engaged through the opposite portions of the depressed part 29. It will thus be seen that when it is desired to permit the convenient entering or exit of persons into and from the car, the operator on the platform shifts the lever 21 at the proper side of the car and causes the extension steps to move on their pivots to be lowered and the wheels 30 will rest on the station platform and any movement of the car will not interfere or cause injury to a person standing on the step.

Having thus described my invention, what I claim is:—

The combination with the stationary step section of a car; of an extension step section pivoted thereto, said extension section comprising spaced side rails and tread rails connecting the same, pivots extending through the adjacent portions of the stationary step and the side members of the extension steps, a lever pivotally mounted and having link connection with the extension step near its pivot, said connection including an arcuate arm, means for holding the lever in an adjusted position, a frame secured to the lowermost of the extension steps and having a depressed portion, wheels mounted therein and shafts engaged through said depressed portions to rotatably support the wheels.

In testimony whereof, I affix my signature, in presence of two witnesses.

GEORGE W. HERSEY.

Witnesses:
 EDMUND CORNEAU,
 JERRY SAVOY.

---

Copies of this patent may be obtained for five cents each, by addressing the "Commissioner of Patents, Washington, D. C."